United States Patent [19]

Chan

[11] Patent Number: 5,790,551
[45] Date of Patent: Aug. 4, 1998

[54] PACKET DATA TRANSMISSION USING DYNAMIC CHANNEL ASSIGNMENT

[75] Inventor: David Chi-Yin Chan, Bellevue, Wash.

[73] Assignee: AT&T Wireless Services Inc., Middletown, N.J.

[21] Appl. No.: 563,816

[22] Filed: Nov. 28, 1995

[51] Int. Cl.$^6$ ........................................ H04J 3/16
[52] U.S. Cl. ........................ 370/458; 370/348; 370/522
[58] Field of Search ........................ 370/333, 337, 370/347, 348, 419, 441, 445, 458, 522, 328, 338; 375/202, 205; 379/201

[56] References Cited

U.S. PATENT DOCUMENTS

| | | | |
|---|---|---|---|
| 3,755,628 | 8/1973 | Games et al. | 370/445 |
| 5,327,576 | 7/1994 | Uddenfeldt et al. | 370/333 |
| 5,329,573 | 7/1994 | Chang et al. | 455/411 |
| 5,396,543 | 3/1995 | Beeson, Jr. et al. | 370/328 |
| 5,463,683 | 10/1995 | Collins et al. | 379/201 |
| 5,502,725 | 3/1996 | Pohjakallio | 370/337 |
| 5,521,925 | 5/1996 | Merakos et al. | 375/202 |
| 5,594,738 | 1/1997 | Crisler et al. | 370/347 |
| 5,598,417 | 1/1997 | Crisler et al. | 370/348 |
| 5,615,211 | 3/1997 | Santore et al. | 370/419 |

OTHER PUBLICATIONS

Patent No. 5,463,646, filed on Jan. 7, 1993 and issued on Oct. 31, 1995 to T.M. Dillon et al.

Patent No. EP 0 681 406 A1, by European Patent Office, filed May 3, 1995 and published on Nov. 8, 1995 to J. Hamalainen et al. Translation:yes.

Patent No. WO 95/31077, published on Nov. 16, 1995 to F. De Seze. Translation: no.

W. C. Wong and D. J. Goodman, "A packet reservation multiple access protocal for integrated speech and data transmission," *IEE Proceedings–I*, vol. 139, No. 6, Dec. 1, 1992, pp. 607–612.

R.F. Quick, Jr. and K. Balachandran, "An Overview of the Cellular Digital Packet Data (CDPD) System," *IEEE International Symposium On Personal, Indoor and Mobile Radio Communications*, Sep. 8, 1993, pp. 338–343.

W. D. Grover, W. A. Krzymien and J. C. Chin, "Sstrategies for Management of Connection–Oriented Data Sessions Employing the Idle Times in Cellular Telephony," *IEEE Transactions On Vehicular Technology*, vol. 44, No. 2, May 1995, pp. 244–252.

A. DeSimone and S. Nanda, "Wireless data: Systems, standards, services," *Wireless Networks*, vol. 1, No. 3, Oct. 1, 1995, Amsterdam, NL, pp. 241–253.

*Primary Examiner*—Douglas W. Olms
*Assistant Examiner*—Shick Hom

[57] ABSTRACT

A method for transmitting packetized data in a cellular communication system uses a dynamic channel assignment scheme. In this aspect of the invention a data control channel is used in addition to the data traffic channel. The mobile end system uses the data control channel to send a request for assignment of a channel for transmission of data—such as a particular frequency/time-slot in a TDMA system. The network responds with the identification of a particular channel that may be used for a particular time period to transmit data. In this aspect of the invention there is no dedicated channel that is used for data transmission. Rather, the network determines a channel that will be free for the specified time period and assigns it for data transmission.

20 Claims, 4 Drawing Sheets

| G | R | DATA | SYNC | DATA | DATA | CDVCC | DATA |
|---|---|------|------|------|------|-------|------|
| 6 | 6 | 16 | 28 | 122 | 12 | 12 | 122 |

*FIG. 5*

| SYNC | SACCH | DATA | CDVCC | DATA | RSVD | CDL |
|------|-------|------|-------|------|------|-----|
| 28 | 12 | 130 | 12 | 130 | 1 | 11 |

PACKET DATA TRANSMISSION USING DYNAMIC CHANNEL ASSIGNMENT

FIELD OF THE INVENTION

This invention involves the transmission of packet data over vacant channels in cellular networks.

BACKGROUND OF THE INVENTION

Transmission of data over cellular networks has been accomplished with high efficiency by transmitting the data in packetized format over vacant voice channels. One variant of this technique is CDPD—Cellular Digital Packet Data—which has been implemented in analog cellular networks such as the Advanced Mobile Phone System (AMPS). See, for example, U.S. Pat. No. 5,404,392. In this implementation, a channel pair is assigned to the CDPD protocol—one channel for forward transmissions and the other for reverse transmissions. On the forward channel, the base station continuously transmits information that mobile stations monitor to detect, synchronize with, and register on, the CDPD channel. When powering-on, the mobile unit scans the channels, locates the forward channel, and registers with the system. If the mobile unit wants to transmit data, it uses the reverse channel which is identified during the power-on process. Since there is one reverse channel that is shared by a multiplicity of mobile users, access to the channel is obtained by use of well defined contention resolution mechanisms that avoid or resolve collisions. Once a particular Mobile-End System (M-ES), such as a cellular data tranceiver, gains access to the channel, it may use the channel to transmit data until it has completed its transmission or it has used the channel a for a system configurable maximum time period.

More advanced cellular networks will operate using digital rather than analog transmission and suggestions have been made to transmit packetized data on vacant channels in these systems as well. By analogy with the application of CDPD to analog systems, packetized data may be sent on an exemplary TDMA system by dedicating specific frequency/time-slot channels to the transmission of the packetized data. In such a system, forward and reverse transmission would take place on these dedicated channels in a manner similar to that described above for CDPD in AMPS. Likewise, in reverse transmission, contention resolution mechanisms would be used to avoid or resolve collisions.

These suggestions, however, carry with them the inherent inefficiencies of CDPD over AMPS. For example, an integral number of channel pairs must be dedicated to data transmission, and contention resolution mechanisms must be employed on the reverse channels that are used for data transmission to avoid or resolve collisions.

SUMMARY OF THE INVENTION

In one aspect of this invention, packetized data is transmitted in a cellular communication system using a dynamic channel assignment scheme. In this aspect of the invention a data control channel is used in addition to the data traffic channel. The mobile end system uses the data control channel to send a request for assignment of a channel for transmission of data—such as a particular frequency/time-slot in a TDMA system. The network responds with the identification of a particular channel that may be used for a particular time period to transmit data. In this aspect of the invention there is no dedicated channel that is used for data transmission. Rather, the network determines a channel that will be free for the specified time period and assigns it to a specific mobile end system for data transmission. This aspect of the invention—which we call "dynamic channel assignment"—permits much more efficient use of the available communication channels.

In addition to dynamic channel assignment, another aspect of the invention permits assignment of more than one channel for data transmission, if more than one is available. This aspect of the invention—which we call "dynamic multi-channel availability"—permits more flexible use of the communications channels for data transmission when they are available. One implementation of this aspect of the invention contemplates simultaneous use of at least two of the available channels for data transmission to increase the efficiency of the network. These at least two channels may be used by different mobile end systems, or may be used at the same time by one mobile end system to transmit data more rapidly and make even more efficient use of the multiple available channels.

Other aspects of the invention include a packet data traffic channel Automatic Retry Request (ARQ) algorithm which significantly increases the efficiency of the packet data control channel, and the use of a priority field to allow for selective treatment of the data request. Additionally, the data control function may be performed on the available voice control channel or may be performed on a dedicated data control channel.

Although the invention has been introduced, and may be discussed in sections of this specification, in terms of a TDMA embodiment, those skilled in the art will recognize that the principles of the invention may be use advantageously with other air interface protocols as well, and such implementations are contemplated within the broad scope of the invention.

DETAILED DESCRIPTION OF THE DRAWING

1. Acronyms

The following acronyms will be used in this specification.

| | |
|---|---|
| BCCH | Broadcast Control Channel (see EIA/TIA IS-136 which is hereby incorporated by reference) |
| CDL | Coded Digital Control Channel Locator (see IS-136) |
| CDPD | Cellular Digital Packet Data (see CDPD System Specification, Release 1.1, which is hereby incorporated by reference) |
| DS | Decode Status, which indicates decode successful or failed |

| | |
|---|---|
| E-BCCH | Extended Broadcast Control Channel (see IS-136) |
| F-BCCH | Fast Broadcast Control Channel (see IS-136) |
| FPCCH | Forward Packet Control Channel in DCCH |
| MDBS | Mobile Data Base Station (which can be one element of a base station as defined by CDPD) |
| MDLP | Mobile Data Link Protocol (see CDPD System Specification, Release 1.1, Part 403) |
| MNLP | Mobile Network Location Protocol (see CDPD Part 501) |
| MNRP | Mobile Network Registration Protocol (see CDPD Part 507) |
| PDCCH | Packet Data Control Channel, which consists of FPDCCH and RPDCCH |
| RACH | Random Access Channel (see IS-136) |
| RRM | Radio Resource Management |
| RRMCH | Radio Resource Management Channel in F-BCCH |
| SACCH | Slow Associated Control Channel (see IS-136) |
| S-BCCH | Short Message Service-Broadcast Control Channel (see IS-136) |
| SCF | Shared Control Feedback information |
| SMP | Security Management Protocol (see CDPD Part 406) |
| TDMA | Time Division Multiple Access |

2. Overview

One aspect of the invention involves the transmission of packetized data in a cellular communication system using a dynamic channel assignment scheme. (The term "channel" as used in this specification refers to the set of parameters that identify a transmission path, for example, in TDMA, a channel is defined by a frequency, time slot and transmission period.) The method involves two types of channels: a packet data control channel and a packet data traffic channel. The packet data control channel consists of a forward packet data control channel and a reverse packet data control channel. Likewise, the packet data traffic channel consists of a forward packet data traffic channel and a reverse packet data traffic channel. While the invention may be practiced in any one of a number of protocols such as AMPS, CDMA, FDMA, etc., the following description will often be in terms of a specific TDMA embodiment. In such description of a TDMA embodiment of the invention, the common terms "digital control channel" and "digital traffic channel" will be used. In the generic description of the invention however, the terms "packet data control channel" and "packet data traffic channel" will be used.

In reverse data transmission a mobile end system first sends a request message on the reverse packet data control channel to, for example, a Mobile Digital Base Station (MDBS). (It will be recognized, however, that use of the MDBS for this function is not necessary for the practice of the invention. Rather, this function may be performed, for example, anywhere in the network.) The mobile end system may obtain access to the reverse packet data control channel by contending with other mobile end systems using, for example, the slotted Aloha channel access mechanism. If the access is successful, the mobile end system may deliver its request for data transmission. In reply, the MDBS may send a response message to the mobile end system on the forward packet data control channel.

If the transmission request is granted, the response message may contain the packet data traffic channel information for the mobile end system's data transmission, e.g., the assigned packet data traffic channel and time slots in the assigned channel to transmit the packet data. If the transmission request is denied, the response message may contain the reason for the denial.

After the mobile end system receives the response message, it switches to the assigned packet data traffic channel at the assigned time slots, and for the assigned time interval, and starts data transmission. When the MDBS receives a data block from the mobile end system, it may set the Decode Status (DS) flag accordingly on the associated forward packet data traffic channel. The mobile end system may monitor the decode status information on the associated forward packet data traffic channel to determine whether each block is transmitted successfully or not. The mobile end system may re-transmit those data blocks with a DS flag indicating that the decode failed during the assigned time slots. When the assigned time slots are exhausted, the mobile end system must cease transmission regardless of the number of successfully transmitted data blocks. If the mobile end system has more data blocks to send, it may request permission for a new transmission through the reverse packet data control channel. After transmitting the data blocks, the mobile end system returns to the forward packet data control channel monitoring state.

In forward data transmission the MDBS sends a request message to one or more mobile end systems on the forward packet data control channel to inform the mobile end systems to listen to a particular forward packet data traffic channel at certain time slots. Each such mobile end system switches to the packet data traffic channel at the assigned time slots, and receives data blocks transmitted at these time slots. In each of the forward packet data traffic channel blocks, there may be an Immediate Acknowledge (IA) flag. This flag is usually only used for full-rate data channels and unicast data transmission. If this flag is set, the mobile end system will send the MAC Acknowledgment message at the next packet data traffic channel block. The mobile end system may or may not acknowledge all forward packet data traffic channel blocks in the packet data traffic channel. If not, the mobile end system may send the MAC Acknowledgment message in the reverse packet data control channel.

Since the MDBS dynamically assigns packet data traffic channels for mobile end systems to transmit data packets, these channels are contention free. Thus, the effective data rate on each packet data traffic channel can potentially achieve 100% of the effective throughput capacity. For example, a TDMA cellular sector contains approximately 15 30-KHz channels or 45 TDMA digital channels. If it is assumed that 30 digital channels are used by voice services, and the packet data control to packet data traffic channel ratio is 1:4, then 12 reverse packet data traffic channels are available. Since each reverse packet data traffic channel offers a data rate of approximately 9 Kbps, the total reverse packet data traffic channel effective data rate is 108 Kbps. Similarly, each forward packet data traffic channel offers a data rate of approximately 9 Kbps and the total forward packet data traffic channel effective data rate is 108 Kbps.

Figure 1:
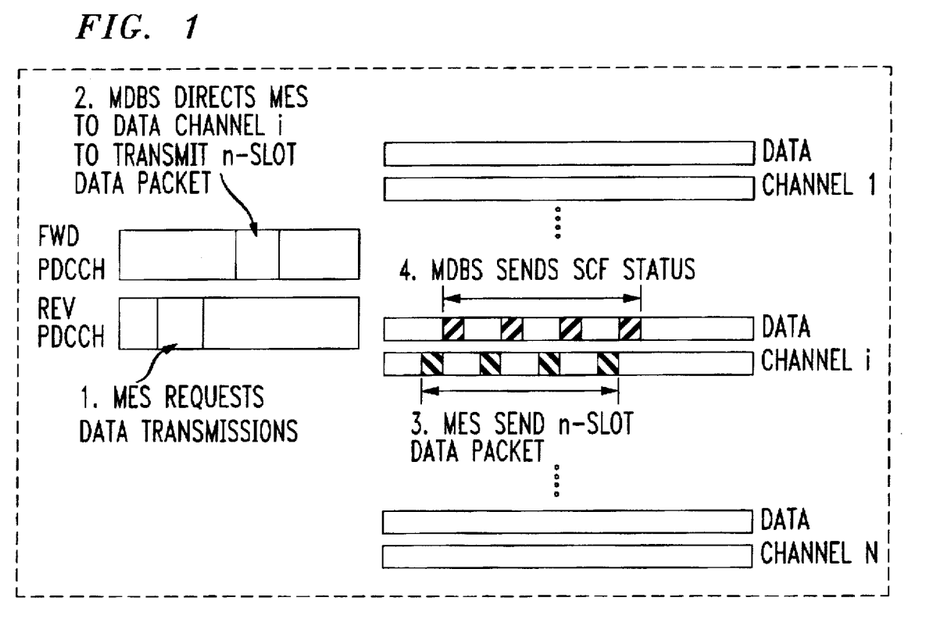
FIG. 1 is a schematic representation of reverse channel access with dynamic channel assignment.
Figure 2:
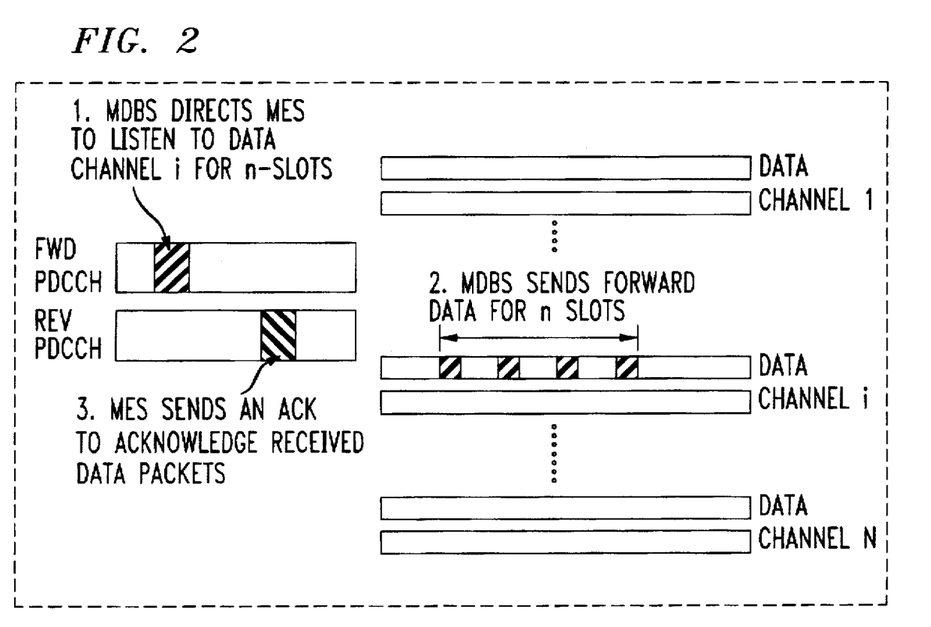
FIG. 2 is a schematic representation of forward channel access with dynamic channel assignment.

FIGS. 1 and 2 show reverse and forward channel access with dynamic channel assignment. As noted in FIGS. 1 and 2, the mobile end system may use the reverse packet data control channel to transmit Data Channel Request messages (MAC_DC_REQ), while the MDBS may use the forward packet data control channel to transmit Data Change Response messages (MAC_DC_RESP) and forward Data Channel Request messages (MAC_DC_REQ). The mobile end system and MDBS use the packet data traffic channels to transmit data packets.

The reverse packet data control channel may reside in the digital control channel of standard TDMA or in a separate reverse channel. When the reverse packet data control channel resides in the reverse digital control channel, the reverse packet data control channel may employ the CSMA channel access protocol described in the RACH of IS-136, which is hereby incorporated by reference. When the reverse packet data control channel resides in a separate reverse channel, the reverse packet data control channel may employ, for example, the Slotted Aloha channel access protocol.

Figure 3:
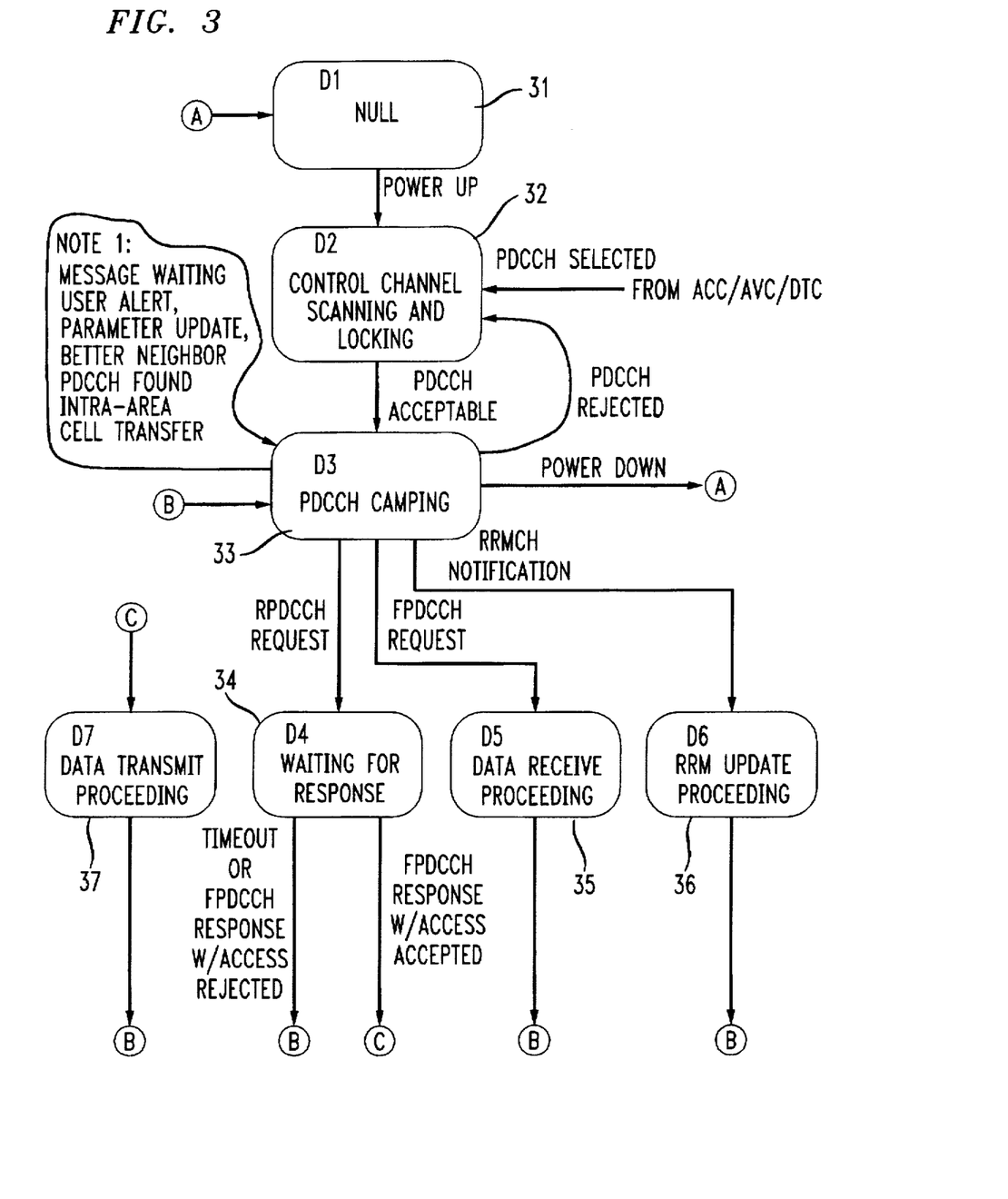
FIG. 3 is a M-ES state overview diagram of one embodiment of the invention.

The above description of a particular embodiment of the invention is depicted in greater detail in the state diagram of FIG. 3. In that diagram, 31 shows that the MAC layer entity within a mobile end system is in the Null state if the mobile end system is powered down.

When a power up occurs, the mobile end system enters the Control Channel Scanning and Locking state depicted at 32. The MAC layer entity within a mobile end system is in the Control Channel Scanning and Locking state when it is in the process of selecting a candidate service provider (see Section 6.2.2 of IS-136.1, which is hereby incorporated by reference). If the candidate packet data control channel satisfies the criteria described in the Control Channel Selection procedure, the mobile end system enters the Packet Data Control Channel Camping state, 33. Otherwise, the mobile end system searches for another candidate packet data control channel. If a power down condition occurs while in this state, the mobile end system attempts to return to the control channel it last used during its current power cycle and sends a Power Down Registration if required by that control channel.

Upon entering the Packet Data Control Channel Camping state, 33, from Control Channel Scanning and Locking state, 32, or for the first time on the current packet data control channel as a result of control channel re-selection, a mobile end system makes an initial reading of a full cycle of F-BCCH and E-BCCH. A mobile end system in this state does not make an access attempt until it has completed its initial reading of a full cycle of F-BCCH (see Section 6.2.3 of IS-136.1, which is hereby incorporated by reference). After completing its initial reading of F-BCCH, the mobile end system leaves this state in response to a forward packet data control channel request, a reverse packet data control channel request or a RRMCH notification.

The MAC layer entity within a mobile end system is in the Waiting for Response state, 34, after it sends a reverse packet data control channel request message to the MDBS. Upon entering this state, the mobile end system sets the reverse packet data control channel response timer. The mobile end system responds to the following conditions as indicated:

forward packet data control channel response message—
If the forward packet data control channel response message with access accepted is received, the mobile end system proceeds to the Data Transmit Proceeding state, 37. If the forward packet data control channel response message with access rejected is received, the mobile end system returns to the Packet Data Control Channel Camping state.

RMPDU_REQ_TMR Time-out:—If the mobile end system has sent the reverse packet data control channel request message MAC_MAX_ATTEMPTS times, it returns to the Packet Data Control Channel Camping state. Otherwise, it resets RMPDU_REQ_TMR, increments the message counter, and retransmits the reverse packet data control channel request message.

The MAC layer entity within a mobile end system is in the Data Receive Proceeding state, 35, after it receives a forward packet data control channel request message from the MDBS. Upon entering this state, the mobile end system opens a data packet traffic channel according to the information in the forward data packet control channel request message and listens to the forward packet data traffic channel at the assigned time slots.

The MAC layer entity within a mobile end system is in the RRM Update Proceeding state, 36, after it receives a RRM notification message from the MDBS. Upon entering this state, the mobile end system updates its radio resource parameters.

Reverse Packet Data Traffic Channel Automatic Retry Request (ARQ) Algorithm

In the reverse packet data traffic channel access, the mobile end system transmits a sequence of blocks in the pre-assigned channel and channel type. After transmitting each data block, the mobile end system monitors the Decode Status flag on, for example, the forward packet data traffic channel to determine whether the data block is successfully transmitted. If the data block transmission fails, the mobile end system may re-transmit the same block until the re-transmitted data block is successful, or the assigned channel duration is exhausted, or the same data block has been transmitted 5 times, including the first time.

When the MDBS receives the first attempt, it decodes the data block. If the data block is successfully decoded, the MDBS will set "Decode Success" in the DS flags. If the data block cannot be decoded successfully, the MDBS will set "Decode Fail" in the DS flags.

When the MDBS receives the second attempt, it decodes the data block. If the data block is successfully decoded, the MDBS will set "Decode Success" in the DS flags. If the data block cannot be decoded successfully, the MDBS will set "Decode Fail" in the DS flags.

When the MDBS receives the 3rd attempt, it decodes the data block. If the data block is successfully decoded, the MDBS will set "Decode Success" in the DS flags. Otherwise, the MDBS will combine the 3 received data blocks using a "bitwise majority vote" algorithm and decode the combined block. If the combined data block is successfully decoded, the MDBS will set "Decode Success" in the DS flags. If the combined data block cannot be decoded successfully, the MDBS will set "Decode Fail" in the DS flags.

When the MDBS receives the 4th attempt, it decodes the data block. If the data block is successfully decoded, the MDBS will set "Decode Success" in the DS flags. Otherwise, the MDBS will combine the last 3 received data blocks using a "bitwise majority vote" algorithm and decode the combined block. If the combined data block is successfully decoded, the MDBS will set "Decode Success" in the DS flags. If the combined data block cannot be decoded successfully, the MDBS will set "Decode Fail" in the DS flags.

When the MDBS receives the 5th attempt, it decodes the data block. If the data block is successfully decoded, the MDBS will set "Decode Success" in the DS flags. Otherwise, the MDBS will combine the last 5 received data blocks using a "bitwise majority vote" algorithm and decode the combined block. If the combined data block is successfully decoded, the MDBS will set "Decode Success" in the DS flags. If the combined data block cannot be decoded successfully, the MDBS will set "Decode Fail" in the DS flags.

In the forward packet data traffic channel access, the retransmission algorithm is similar to that for the reverse packet data traffic channel access, except that the reverse packet data traffic channel does not contain DS flags. Instead, the mobile end system transmits the MAC acknowledgment block to acknowledge the receiving status.

Performance Analysis of a Specific Embodiment

The following performance analysis for this invention in a TDMA environment is divided into two parts: Physical and MAC layer performance analysis. In the Physical layer, the throughput performance is the maximum uncoded data rates on the forward and reverse channels. In the MAC layer, the throughput performance is the normalized throughput capacity using the MAC layer protocol.

Physical Layer Performance

The practice of this invention in a TDMA environment requires the data control channel and data traffic channel to transmit forward and reverse control and data packets. The frame structure of the data control channel may be the same as that in IS-136 The frame structure of the data traffic channel may be changed. From a recent analysis by Secuta (Alan Secuta, "RLP Performance Report", Contribution No. TR45.3.2.5/93.08.23.07, Aug. 5, 1993), it appears that the rate 5/6 punctured convolutional code (punctured from the rate 1/2 convolutional code) offers substantial throughput improvement over the rate 1/2 convolutional code. At 0% BLER, the rate 5/6 convolutional code offers 10 Kbps in a full-rate digital channel. In the Secuta analysis, 12% of the cell-site coverage has 17 dB C/I or lower, and 81% of the cell-site coverage has 22 dB C/I or higher. The effective throughput levels at 17 and 22 dB C/I are approximately 7.8 and 9.2 Kbps, respectively. In both C/I signal levels, the rate 5/6 convolutional code offers better throughput performance than the rate 1/2 convolutional code does. Moreover, the rate 5/6 convolutional code offers approximately 5.3 Kbps even at 14 dB C/I.

The following table compares the throughput performance and BLER of different coding schemes.

TABLE 1

Uncoded Data Rate of Reverse Digital Traffic Channel

| Code | Encoded data/slot (bits/bits) | Uncoded data (bits) | Data rate/data channel (Kbps) | BLER@17dB C/I |
|---|---|---|---|---|
| rate ½ convolutional | 260/324 | 109 | 5.45 | ~5% |
| rate ⅚ convolutional | 260/324 | 200 | 10.0 | ~22% |

As noted above, the mobile end systems transmit on the reverse packet data control channel and the reverse packet data traffic channel. The mobile end systems use the reverse packet data control channel to transmit control and short data packets. The mobile end systems use the reverse packet data traffic channel to transmit data packets. Because the reverse packet data traffic channel access is dynamically assigned by the MDBS, no collision occurs in the reverse packet data traffic channel. The mobile end system must send data blocks in the assigned TDMA slots. If the assigned slots are not sufficient for all data blocks to be transmitted, the mobile end system may request another reverse packet data traffic channel access to transmit the rest of the data blocks. When a mobile end system requests slots for data transmissions, the MDBS assigns a maximum of 31 TDMA slots for the full-rate packet data traffic channel access, or approximately 95 TDMA slots for the triple-rate packet data traffic channel access.

Figure 4:
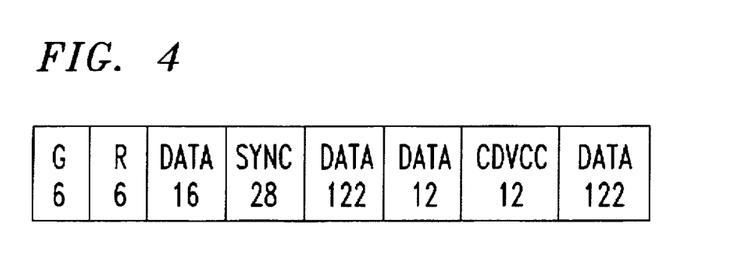
FIG. 4 is schematic representation of the time slot format of the reverse digital traffic channel.

FIG. 4 shows the time slot format of the reverse packet data traffic channel. Each digital channel consists of 2 time slots in each 6-slot TDMA frame. Each TDMA slot consists of 324 bits or 6.67 msec, and it contains a 260-bit encoded data field. For the half-duplex mobile end systems, each mobile end system can occupy a 2-slot (full rate) data traffic channel to transmit data. For the full-duplex mobile end systems, each mobile end system can occupy all 6 TDMA slots (i.e. 3 reverse packet data traffic channels) to transmit data. Thus, the maximum data rate for the full-duplex mobile end systems is 30 Kbps.

Figure 5:
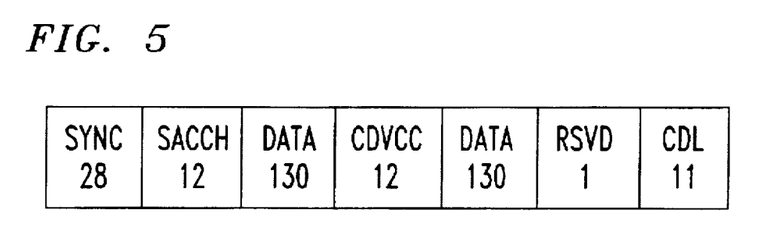
FIG. 5 is schematic representation of the time slot format of the forward digital traffic channel.

The MDBS transmits control and acknowledgment packets on the forward packet data control channel and transmits data packets on the packet data traffic channel. FIG. 5 shows the time slot format of the forward packet data traffic channel. Each TDMA slot consists of 324 bits, in which 260 bits are encoded data. The uncoded data rate of the forward packet data traffic channel is the same as that of the reverse packet data traffic channel. Some fields in the forward and reverse time slots can be converted to the data field, such as SACCH, CDVCC, RSVD, and CDL depending on the impact of such conversion on standard TDMA operation.

For both half-duplex and full-duplex mobile end systems, they can receive data on all 6 TDMA slots (i.e. 3 forward packet data traffic channels). Thus, the maximum forward data rate is 30 Kbps. If the SACCH, CDVCC, RSVD and CDL fields are converted to the data field, the maximum forward data rate is approximately 34.5 Kbps MAC Layer Both the MDBS and mobile end system use the packet data control channel to transmit control and acknowledgment packets and use the packet data traffic channel to transmit data packets. Since the forward channel is a point-to-multi-point access, the MDBS can fully utilize the forward packet data control channel and packet data traffic channels.

The reverse packet data control channel is a multi-point-to-point access, the mobile end systems contend for the reverse packet data control channel with others using, for example, the slotted Aloha random access scheme or the RACH access scheme (non-persistent CSMA). When the reverse packet data control channel resides in the digital control channel, the RACH access scheme is used. When the reverse packet data control channel occupies a separate channel, the slotted Aloha protocol can be used to optimize the throughput performance.

Figure 7:
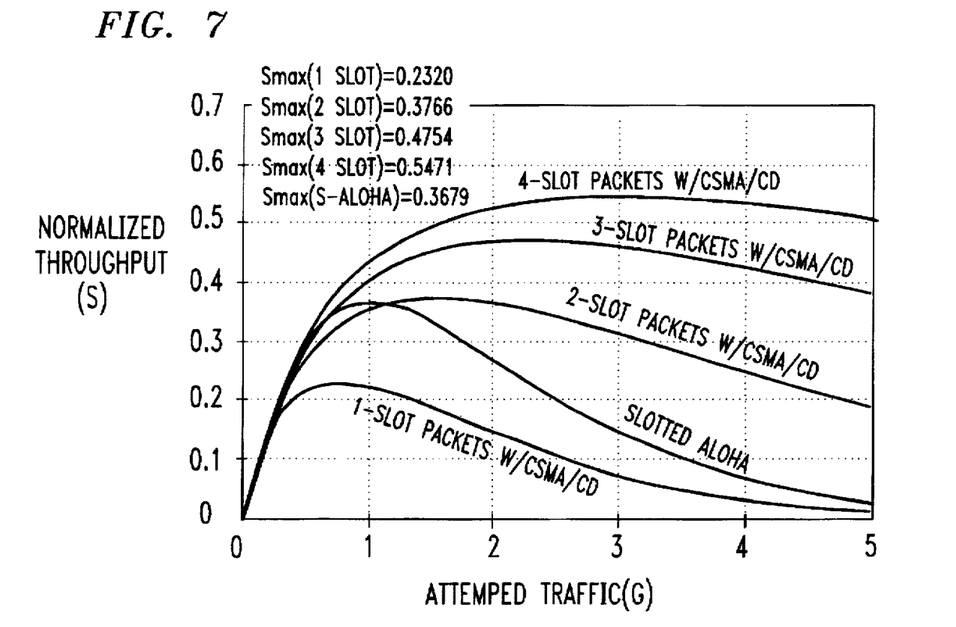
FIG. 7 shows the throughput performance of a slotted Aloha and non-persistent CSMA/CD.

FIG. 7 depicts the throughput performance of slotted Aloha and non-persistent CSMA/CD. If the reverse packet data control channel access is successful, the MDBS will send a response packet to the mobile end system and inform the mobile end system to go to an assigned packet data traffic channel. Then, the mobile end system will transmit data packets on the assigned reverse packet data traffic channel without any packet collision.

The normalized throughput equation of slotted Aloha, $S_{rc}$, is given as:

$$S_{rc} = Ge^{-G}$$

where G is the attempted traffic on the reverse packet data control channel. If N is the number of data traffic channels, and $L_r$ is the average data packet length on the reverse data traffic channel, the normalized throughput equation for each reverse packet data traffic channel, $S_{rd}$, is:

$$S_{rd} = MIN\{GL_r e^{-G}/N, 1.0\}$$

Figure 6:
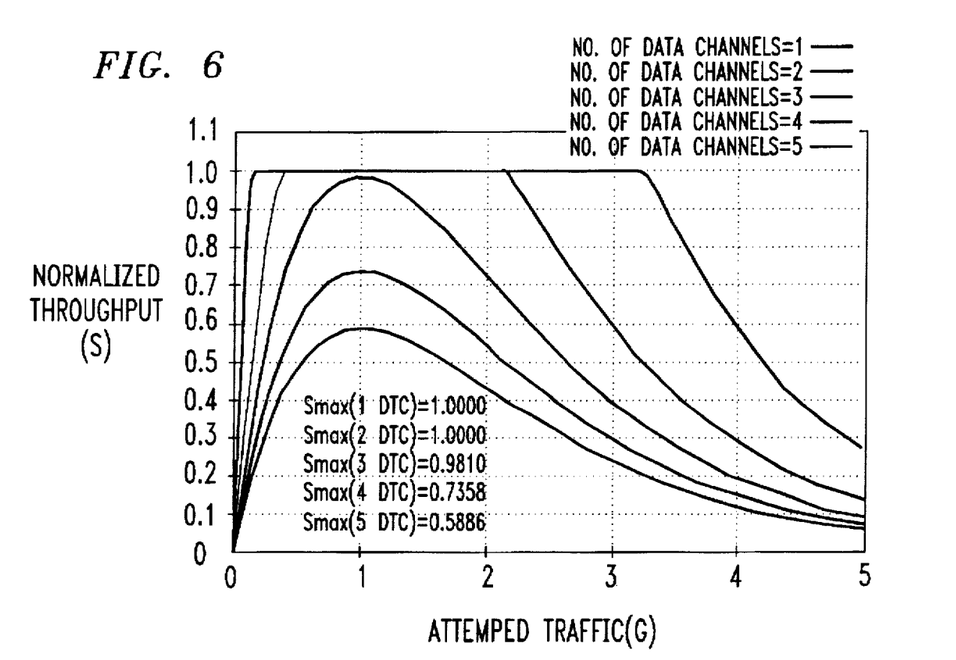
FIG. 6 shows the throughput performance as a function of attempted traffic with different numbers of data traffic channels.

FIG. 6 shows the throughput performance of the reverse data traffic channel with different N where $L_r$ is 8 slots long.

The forward packet data control channel contains Forward Request (F-Req) and Forward Response (F-Resp) packets. The MDBS transmits F-Req to inform one or multiple mobile end systems that one or more data blocks are sent to the mobile end systems through a certain forward packet data traffic channel, and it transmits F-Resp to respond to a mobile end system transmit request that the mobile end system may transmit on the assigned reverse packet data traffic channel.

If $S_o$ is the bandwidth of the forward packet data control channel used by other services, such as F-BCCH, E-BCCH, and S-BCCH and $L_f$ is the average data packet length on the forward packet data traffic channel then the normalized throughput equation for each forward packet data traffic channel, $S_{fd}$, is given by:

$$S_{fd} = \text{MIN}\{(1-S_{rc}-S_o)L_f/N, 1.0\}$$

Services Primitives

There are three services primitives that may be required to practice this invention in the TDMA environment. These primitives are required for the MDBS and mobile end system to access the packet data control channel and packet data traffic channel. These primitives are: MAC_DC_REQ, MAC_DC_RESP, MAC_DT_DATA.

The MAC_DC_REQ primitive is used by the MDBS or mobile end system to request a data transmission on the packet data control channel. This primitive may contain options to send short data frames, RR (defined in MDLP, CPDP specification release 1.1 which is hereby incorporated by reference), EKE and IKE (defined in SMP, CDPD specification release 1.1), ESH and ISC (defined in MNRP, CDPD specification release 1.1).

The MAC_DC_REQ primitive contains the following mandatory fields: color code (area and group colors), data packet size (in TDMA slots), data channel type requested (half-rate, full-rate, double-rate, triple-rate, etc.).

The MAC_DC_RESP primitive is used by the MDBS to respond to the originating mobile end system whether the data transmission request is accepted. If accepted, the MDBS will assign a packet data traffic channel for a specified duration, in TDMA slots. The assigned data channel type may be equal or lower than the requested data channel type. The primitive may contain option fields to send short data frames.

The MAC_DC_RESP primitive contains the following mandatory fields: color code, assigned channel type, transmission start time, assigned data channel (specifying the RF channel number and digital channel(s)).

The MAC_DT_DATA primitive is used by the MDBS and mobile end system to transmit a data burst at a pre-assigned RF channel, channel type, and time slots. Preceding this primitive, the MAC_DC_REQ primitive must be sent to request the data transmission. The following table summarizes the MAC layer primitives.

TABLE 2

MAC Layer Primitives

| Primitive | Path | Fields | Size (bits) | Description |
|---|---|---|---|---|
| MAC_DC_REQ | both | color code | 8 | area color and group color codes |
| | | data packet size | 8 | requested data packet size in TDMA slots. If equal to 0, no data channel assignment will be requested |
| | | data channel type | 3 | requested data channel type, i.e., half-rate, full-rate, double-rate, etc. |
| | | data rate | 1 | request data rate, i.e., slow or fast |
| | | priority | 1 | data priority, i.e., high or low |
| | | option | <N − 21 | contain short data frame or other information |
| MAC_DC_RESP | Forward | color code | 8 | area color and group color codes |
| | | data packet size | 8 | assigned data packet size |
| | | start time | 8 | assigned data transmission start time, i.e., no. of slots after this response frame |
| | | transmission duration | 8 | assigned data transmission duration data |
| | | channel type | 3 | assigned data channel type, it must be lower than or equal to the request data channel type |
| | | data rate | 1 | assigned data rate, must be lower than or equal to requested data rate |
| | | option | <N − 28 | contain short data frame or other information |
| MAC_DT_DATA | Both | color code | 8 | area color and group color codes |
| | | data | N − 8 | data field |

It will be noted that in the MAC_DC_REQ primitive there is a field that permits setting a priority code for the data that is to be transmitted. This code can be used identify that data transmission for special treatment, for example, to assign a traffic channel to that data transmission prior to others.

Radio Resource Management

The MDBS sends the RRM information to mobile end systems through the RRMCH. The RRMCH is created to offer CDPD RRM services, and it may reside in the Reserve Channel of the data control channel.

The RRM protocol consists of the following functions: autonomous registration; switch channel, intra-cell transfer, inter-cell transfer; channel quality measurement, such as BER and RSSI; mobile station location management; adjacent channel information update; congestion control, and sleep control.

The RRM protocol, provided in Part 405 of CDPD specification 1.1, may be used for the RRM protocol of CDPD/TDMA with minor modifications. This RRM protocol may provide the same coverage as the TDMA voice coverage in order to perform hand-off simultaneously between voice and data services.

Reverse Channel Access Mechanisms

The following table summarizes characteristics of different channel access mechanisms.

Summary of Characteristics of Different Channel Access Mechanisms

| Protocol | Normalized Throughput Capacity (%) | Comments |
|---|---|---|
| Slotted Aloha | 36% | only fixed size packets |
| Slotted non-persistent DSMA | 17, 28, 35, 40, 58% for 1, 2, 3, 4, 10-slot packets | allow various size packets |
| Slotted non-persistent DSMA/CD | 23, 37, 47, 54, 75% for 1, 2, 3, 4, 10-slot packets | allow various size packets |
| Slotted 1-persistent DSMA/CD | ~10–20% lower than slotted non-persistent DSMA/CD | allow various size packets, shorter access delay than slotted non-persistent DSMA/CD |
| Slotted non-persistent DSMA/CD with reservation | lower than slotted non-persistent DSMA/CD | allow various size packets, unbalance data performance favoring heavy users |
| Virtual Time Synchronous DSMA/CD | equal or higher than slotted non-persistent DSMA/CD | allow various size packets, much shorter access delay than slotted non-persistent DSMA/CD |
| Slotted Aloha/N-server | low capacity for short packets, high capacity for 5-slot or longer packets | allow various size packets, require control sub-channel and data sub-channels |
| Dynamic Channel Assignment | high capacity for 2-slot or longer packets | allow various size packets, require control channel and data channels, use all available data channels to achieve high data throughput |

Advantageous Characteristics of the Invention

The following advantages are among those that accrue with practice of the disclosed invention, for example, in a TDMA environment:

1. The physical layer and frame timing remain the same as that in IS-136. Thus, the IS-136 compatible mobile phone can support both voice and data services without hardware changes.

2. Since the physical layer of IS-136 is used and most of CDPD's protocol layers are used (MDLP, SNDCP, MNRP, SMP, etc.), the design effort required for offering data services over TDMA in accordance with this invention is minimal. However, the performance analysis of IS-136 on PCS channels is required.

3. The rate 1/2 and rate 5/6 (punctured) convolutional code may be used for the FEC. The effective data rate on the forward and reverse full-rate data channels is 10 Kbps. The current TDMA mobile phone (IS-136 compliant) can be re-programmed to support data services in accordance with this invention.

4. In CDPD/AMPS, the half-duplex CDPD modem suffers significant performance penalty because it can only transmit one block at each time and it may miss forward channel traffic while it is transmitting. In this invention, the half-duplex CDPD modem occupies a full-rate digital channel when it transmits in the reverse data channel. The maximum reverse channel data rate is approximately 10 Kbps, and the maximum forward channel data rate is approximately 30 Kbps. Also, the modem does not miss forward channel traffic unless it misses the FDC-Assign packet. The full-duplex CDPD modem may increase the reverse channel data rate to approximately 30 Kbps.

5. The aggregated throughput capacities of the forward and reverse channels in this invention is 200% higher than that of the forward and reverse channels in CDPD/AMPS.

6. In accordance with this invention a mobile end system can simultaneously monitor both voice and data (long and short messages) without degrading voice or data services.

7. An MD-IS can support the MDBSs for data transmission in AMPS, and in accordance with this invention, in other protocols such as, for example, TDMA. In the TDMA embodiment no changes are required for the SNDCP layer and above. In the MDLP layer, only parameter values may be required to change.

8. In CDPD/AMPS, the MAC layer's maximum blocks transmitted is 16 and minimum idle time is 30 microslots. These parameters are tuned to offer fair access from all mobile users. However, these parameters lower the throughput performance for each mobile end system. When this invention is used in a TDMA environment, for example, the maximum block size can be much higher than 16 and the minimum idle time is not required. These new parameter values allow each mobile end system to maximize its reverse channel data rate.

9. In the exemplary embodiment of this invention in a TDMA environment, the MDBS has full control of the channel arrangement. It can assign all unused voice channels for data services. If any of these unused channels is required for voice services, the MDBS can reassign some of these unused channels for voice services and block them from data services. In channel hopping CDPD/AMPS voice channels preempt data channels causing hopping, but in this embodiment of the invention the data channels that are assigned are reserved for the total period of the assignment.

10. The aggregated throughput capacity of this invention when practiced in a TDMA environment is significantly higher than that of CDPD/AMPS. For example, if 5 RF channels of a 15-RF channel sector are not used by TDMA voice services, the aggregated throughput capacity is approximately 216 Kbps (forward+reverse channels) which is about 10 times of the throughput capacity of CDPD/AMPS.

What is claimed is:

1. A method of sending packetized data over a communication network, comprising:

a) transmitting, over a packet data control channel, a request by a requestor to send packetized data;

b) determining at least one available packet data traffic channel and time interval during which the packetized data may be sent the packet data traffic channel being different from the packet data control channel;

c) transmitting to the requestor, over the packet data control channel, an identification of the at least one available packet data traffic channel and the time interval during which the packetized data may be sent; and d) transmitting the packetized data from the requestor over the at least one available packet data traffic channel during the time interval.

2. The method of claim 1 wherein the communications network is a cellular network, and the said cellular network determines the at least one available packet data traffic the time interval during which the packetized data may be sent.

3. The method of claim 2 wherein an Mobile Data Base Station MDBS determines the at least one available packet data traffic channel and the time interval during which the packetized data may be sent.

4. The method of claim 2 wherein more than one data packet traffic channel and time interval are identified for transmission of the packetized data.

5. The method of claim 2 wherein a mobile end system transmits the packetized data over the at least one available packet data traffic channel during the time interval.

6. The method of claim 5 wherein at least two mobile end systems transmit the packetized data over the more than one data packet traffic channel and time interval, each mobile end system transmitting on one data packet traffic channel and time interval.

7. The method of claim 5 wherein at least two mobile end systems transmit the packetized data over the more than one data packet traffic channel and time interval, each mobile end system transmitting on one data packet traffic channel and time interval.

8. The method of claim 5 wherein one mobile end system transmits the packetized data over the more than one data packet traffic channel and time interval.

9. The method of claim 2 wherein the packet data control channel is different from the voice control channel.

10. The method of claim 2 wherein the channels are Time Division Multiple Access TDMA channels.

11. The method of claim 2 wherein the channels are Code Division Multiple Access CDMA.

12. The method of claim 2 wherein the channels are Advanced Mobile Phone Service AMPS channels.

13. The method of claim 2 wherein, if the transmitting the packetized data step fails, the packetized data is retransmitted over the at least one available packet data traffic channel without reassignment of another at least one available packet data traffic channel.

14. The method of claim 13 wherein data blocks involved in failed transmissions, and representing the same data, are combined during decoding.

15. The method of claim 14 wherein the combined data blocks are decoded using a bitwise majority vote algorithm.

16. The method of claim 15 wherein the data is decoded by combining at least three failed transmissions.

17. The method of claim 16 wherein on each failed transmission after the second failed transmission, the last three transmissions are combined in the decoding process, until at least five transmissions fail.

18. The method of claim 2 wherein the at least one available data traffic channel is determined, at least in part, based on the contents of a priority field transmitted with the request.

19. A method of transmitting data over unused channels in a Time Division Multiple Access TDMA cellular communications network comprising:

a) transmitting, by a mobile end system, over a reverse packet data control channel, a request to send packetized data;

b) determining in a base station at least one available reverse TDMA traffic channel and time interval during which the packetized data may be sent, the packet data traffic channel being different from the packet data control channel.

c) transmitting, by the base station to the mobile end system, over a forward packet data control channel, the identification of the at least one available reverse TDMA data traffic channel and the time interval during which the data may be sent; and d) transmitting, by the mobile end system, the packetized date over the at least one available reverse TDMA data traffic channel during the time interval.

20. A method of transmitting data over unused channels in a Time Division Multiple Access TDMA cellular communications network comprising:

a) transmitting by a base station, over a forward packet data control channel, a request to send packetized data;

b) determining in the base station at least one available forward TDMA data traffic channel and time interval during which the packetized data may be sent; the packet data traffic channel being different from the packet data control channel.

c) transmitting, by the base station, over a forward packet data control channel, the identification of the at least one available forward TDMA data traffic channel and the time interval during which the data may be sent; and d) transmitting, by the base station, the packetized data over the at least one available forward TDMA data traffic channel during the time interval.

* * * * *